United States Patent
Barbetti et al.

(10) Patent No.: US 8,464,775 B2
(45) Date of Patent: Jun. 18, 2013

(54) TOOL FOR TIRE UNINSTALLING AND INSTALLING MACHINES

(75) Inventors: Mauro Barbetti, Correggio (IT); Roberto Iotti, Correggio (IT); Gianfranco Pellacani, Correggio (IT)

(73) Assignee: Teco S.r.l., Correggio (Reggio Emilia) (IT)

( * ) Notice: Subject to any disclaimer, the term of this patent is extended or adjusted under 35 U.S.C. 154(b) by 422 days.

(21) Appl. No.: 12/781,581

(22) Filed: May 17, 2010

(65) Prior Publication Data

US 2010/0288445 A1 Nov. 18, 2010

(30) Foreign Application Priority Data

May 18, 2009 (IT) .............................. MO2009A0130

(51) Int. Cl.
*B60C 25/135* (2006.01)
*B60C 25/00* (2006.01)
*B60C 25/128* (2006.01)
*B60C 25/132* (2006.01)
*B60B 30/00* (2006.01)

(52) U.S. Cl.
USPC ....... 157/1.24; 157/1.22; 157/1.26; 157/1.28; 157/1.3; 157/11; 157/14; 157/20; 157/21

(58) Field of Classification Search
USPC .................................. 157/1.24, 1.28, 1.3, 14
See application file for complete search history.

(56) References Cited

U.S. PATENT DOCUMENTS

| 2,505,172 | A | * | 4/1950 | Coats ........................... 157/1.24 |
| 2,556,024 | A | * | 6/1951 | Bourdon et al. ............. 157/1.24 |
| 3,029,860 | A | * | 4/1962 | Schultz et al. ............... 157/1.22 |
| 3,086,578 | A | | 4/1963 | Breazeale et al. |
| 4,462,450 | A | * | 7/1984 | Robinson et al. ............. 157/1 |
| 6,527,032 | B2 | * | 3/2003 | Corghi ........................ 157/1.28 |
| 7,188,656 | B2 | * | 3/2007 | Gonzaga ..................... 157/1.17 |

FOREIGN PATENT DOCUMENTS

| DE | 2416668 | 11/1974 |
| EP | 1584495 | 10/2005 |
| EP | 2042351 | 4/2009 |

OTHER PUBLICATIONS

Italian Patent and Trademark Office, Search Report (relevant portions are in English).

* cited by examiner

*Primary Examiner* — Monica Carter
*Assistant Examiner* — Danny Hong
(74) *Attorney, Agent, or Firm* — Themis Law

(57) ABSTRACT

A tool for tire uninstalling and installing machines includes an element for connection to a movable bearing member of the tire uninstalling and installing machine, which has a longitudinal axis, and a round contact element which is freely and rotatably supported by said connection member about a rotation axis and which has an external outline in contact with a contact portion of a side of a tire installed to a rim, the round element having a flared contacting and lifting surface suitable to contact and lift the tire from the rim, which has a base facing toward the rim and defining a first opposed vertex, touching means extending from the base toward the rim for touching a portion of the rim.

10 Claims, 6 Drawing Sheets

TOOL FOR TIRE UNINSTALLING AND INSTALLING MACHINES

FIELD OF THE INVENTION

The present invention relates to a tire uninstalling and installing machine, which can be particularly used for removing low-profile tires or run-flat tires, i.e. those that can roll even when they are deflated, which tires have in both cases very rigid sides, or shoulders, from their rims.

BACKGROUND OF THE INVENTION

Tools have been long known and used, which are installed to tire installing and uninstalling machines for removing tires from their rims, thereby facilitating the work of tire repairers.

A tire uninstalling and installing machine comprises a base with a substantially horizontal working table top installed thereto, which table top rotates about a perpendicular rotation axis, and has a series of clamps in diametrically opposite pairs, which are designed to be actuated to simultaneously move in centripetal or radial direction on the table top to hold or release an edge of a rim of a wheel that is laid by the tire repairer on the working table top for tire uninstalling or installing.

The tire uninstalling and installing machine also includes a column that extends upwards from the base and is integral with the latter, and carries a transverse arm whose free end facing towards the table top is equipped with a further arm facing towards the table top and substantially parallel to the column, which has connections for tire repairing tools.

Particularly, tire repairers encounter difficulties in uninstalling tires that have very low sides, typically tires for high-performance cars, or run-flat tires, that can roll even when they are deflated, without losing their directional ability.

These difficulties mainly arise because, when a wheel is locked on the table top, typically in a lying or substantially horizontal position, the space defined between the table top and the bottom side of a tire, or between the upper surface of the base and such side is very small, such that no working tools for removal of the tires from the rims can be introduced therein, which tools are actuated by actuators installed to the tire uninstalling and installing machines for this purpose.

A tire repairer can only use these tools after removing in a substantially easy manner the bead that rests against the upward edge of the wheel, and manually lifting with an auxiliary lever a downward portion of the bead until it overcomes the upper edge of the rim, by upwardly moving the whole tire and weight of the latter.

Only in this condition, there will be enough space for later introduction of a working tool known as a bead lifter between the base and the lead to be lifted, while it is being already held lifted by the tire repairer.

With the bead lifter introduced between the base and the side of the tyre, the thrust of the actuators that control the movements of the bead-lifting tool, with which the tire uninstalling and installing machine is equipped, may be used for the lower bead to fully pass over the upper edge of the rim, while the table top is rotated and the tire is lifted upwards out of its rim.

A feature required of these bead lifting tools is that they shall have a lifting path with a very gradual ascending profile, and a sufficiently large support surface for the sides and beads, to prevent any first upward pushing contact with the lower side of a tire from causing the latter to bend upwards and partially wrap the bead lifting tool, thereby affecting the effectiveness of the pushing action to pass over the upper edge of the rim.

In other words, these bead lifting tools are required to have a wide surface in contact with the side of the tyre, and also conformed to afford a progressive pushing action.

Prior art bead lifting devices may consist, for instance, of a pair of rollers supported by special movable position adjusting arms, which are placed in radial succession relative to the direction of rotation of the table top, to converge towards the center thereof.

The longitudinal axes of these rollers are maintained with different inclinations to create the required ascending path for progressively lifting the lower beads of the tires.

Once the bead lifting device has been placed next to the rim, and the portion of the lower bead that is manually lifted by the tire repairer has been laid on the first of the two rollers, the table top is rotated, whereupon the lifted bead progressively lies also on the second roller after passing over the upper edge of the rim.

Another embodiment of these prior art bead lifting devices uses a single roller supported with a substantially horizontal rotation axis at one end of a corresponding support arm that is movable relative to the table top.

This roller has the free end, designed to lie against the side of a tyre, with a frustoconical shape tapering away from the table top.

The outer edge of the roller forms a profile for contact with the tire beads whereas the outer tapering surface creates the desired progressive bead lifting profile.

As mentioned above, this prior art has the drawback of not allowing the use of a bead lifting device driven by drive members of the tire uninstalling and installing machine, from the very start of the process of lifting the lower bead of a tire of a wheel locked on the working table top.

A further drawback is that prior art bead-lifting devices often violently hit the edges of the wheel rims as they are positioned thereon, and are a danger for the integrity of rims.

Rims, especially those designed for installing low shoulder tires or run-flat tires are very delicate and expensive and any damage thereto will cause huge financial damages.

A further drawback is that proper positioning of bead-lifting devices is very uncertain, as the positioning area is substantially hidden to tire repairers' view by the wheels themselves, which obstruct the full view of this area and may cause errors by tire repairers.

SUMMARY OF THE INVENTION

One object of the invention is to improve the state of the art.

Another object of the invention is to provide a tool for tire uninstalling and installing machines that allows the performance of the whole process of passing over the edges of the rims locked on the table tops and hence affords full automatic tire uninstalling.

One more object of the invention is to provide a tool for tire uninstalling and installing machines allowing exposed or automatic accurate positioning, as well as proper progressive lifting of tire beads, without causing any deformation of their sides.

A further object of the invention is to provide a tool for tire uninstalling and installing machines that causes no damage to the wheel rims during the tire uninstalling and installing process.

In one aspect the invention relates to a tool for tire uninstalling and installing machines as defined in claim 1, comprising: an element for connection to a movable bearing member of said tire uninstalling and installing machine, which has a longitudinal axis; a round contact element which is freely rotatably supported by said connection member about a rotation axis and which has an external outline in contact with a contact portion of a side of a tire installed to a rim; said round element having: a flared contacting and lifting surface suitable to contact and lift said tire from said rim, which has a base facing toward said rim and defining a first opposed vertex; characterized in that touching means extend from said base toward said rim for touching a portion of said rim.

Therefore, the invention allows fully automatic uninstalling and reinstalling of tires on their respective rims, even when tires have very rigid sides, like in the case of low-shoulder or run-flat tires.

Also, the tool for tire uninstalling and installing machines may be also installed on tire uninstalling and installing machines that had no such tool at the start.

BRIEF DESCRIPTION OF THE DRAWINGS

Additional characteristics and advantages of the invention will be more apparent from the detailed description of a few preferred, non-exclusive embodiments of a tool for tire uninstalling and installing machines according to the invention, which is described with non-limiting examples with the help of the annexed drawings, in which.

DETAILED DESCRIPTION OF AN EMBODIMENT OF THE INVENTION

Figure 1:
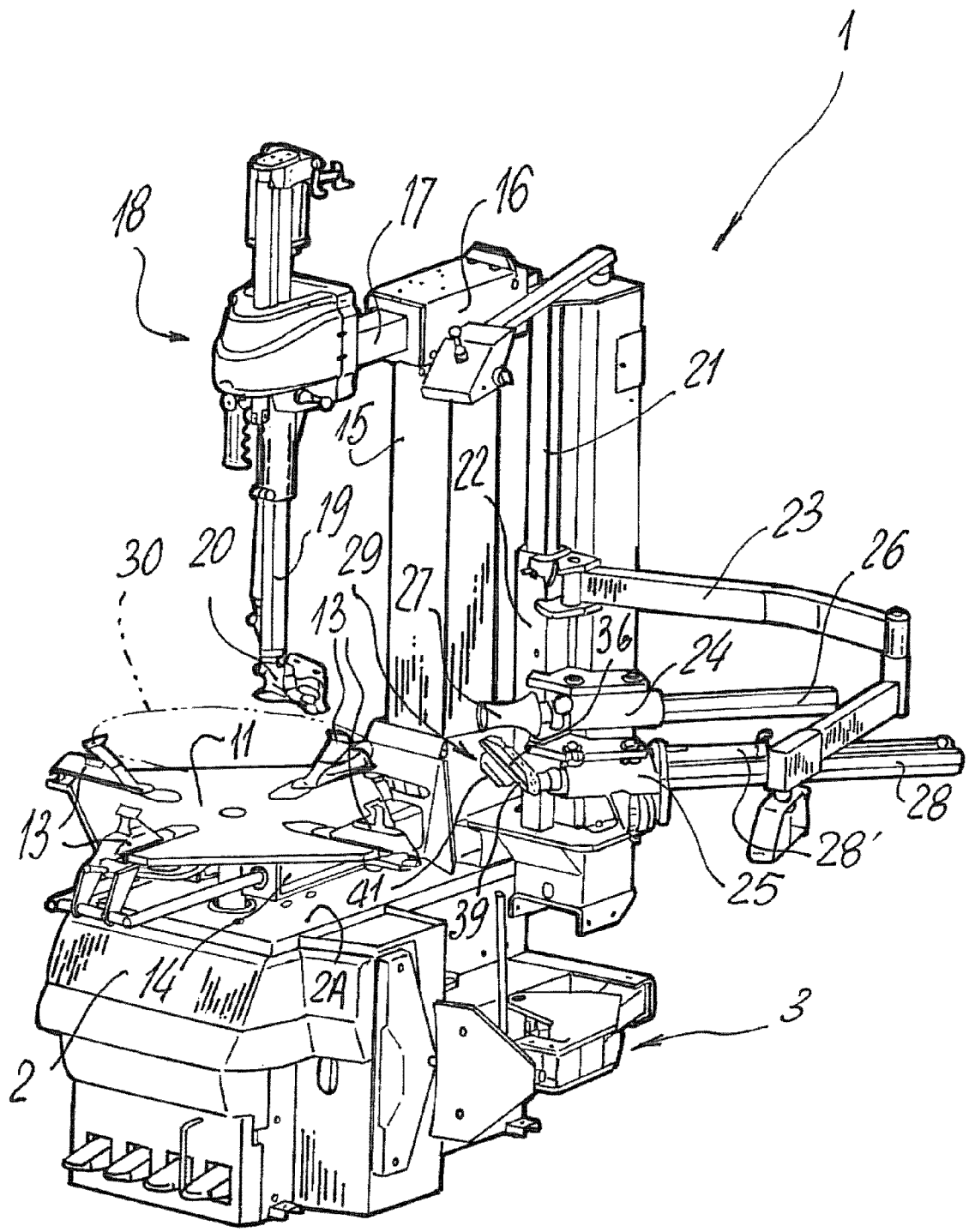
FIG. 1 is a perspective view of a tire uninstalling and installing machine equipped with a tool for tire uninstalling and installing machines of the invention.

Referring to the above figures, numeral 1 designates a tire uninstalling and installing machine which comprises a base 2 having a bead removing device 3 on one side, which is adapted to remove the beads 4 of a tire 5 (see FIG. 6) from the peripheral edges 6 of a rim 7 of a vehicle wheel 8.

The beads 4 are known to be a reinforced part of the inner circumference of a side 9 of the tire 5 and, in a configuration of normal use of the wheel 8, rest against the peripheral edges 6 and are contained in the coupling channel 10 of the rim 7.

The tire uninstalling and installing machine 1, briefly referred to hereinafter as machine 1, has a working table top 11 installed above the base 2, which is rotatably driven by a motorized shaft 12 that extends from a motor unit held within the base 2, and not visible in the drawings.

Two pairs of clamps (or jaws) 13 are installed to the working table top 11, which are disposed along two perpendicular axes and have a centripetal movement along these axes, when driven by a drive unit 14 located beneath the table top 11, in the space defined between the latter and a top face 2A of the base 2.

A substantially vertical column 15 is installed in an eccentric position relative to the base 2, and has a prismatic, typically square or rectangular cross section, with a lower end joined to the base 2 and an opposite upper end equipped with a transverse sleeve 16 through which a first arm 17 slides to and fro, parallel to the table top 11.

This first arm 17 has an end facing towards the table top 11 with a connection 18 for a shaft 19 which is supported substantially parallel to the motorized shaft 12 and which has, at one lower end, a standardized connection 20 for alternately connecting various tools to be used for uninstalling and installing tires 5.

A second column 21 is provided parallel to the column 15, and has a carriage 22 sliding thereon, that supports a second arm 23 articulated in two successive sections, a further horizontal sleeve 24 and an underlying sleeve 25.

A third arm 26 is slideably installed in the further sleeve 24, which carries a presser roll 27 at an end facing towards the table top 11, which roll freely rotates about a rotation axis substantially parallel to such table top and is designed to press upon a tire 5 of a wheel 8, when the latter is placed on the working table top 11.

A fourth arm 28 is installed in the underlying sleeve 25, to reciprocatingly slide towards or from the table top 11, which arm has a tool 29 for tire uninstalling and installing machines 1 of the invention, at an end facing towards the table top.

Figure 2:
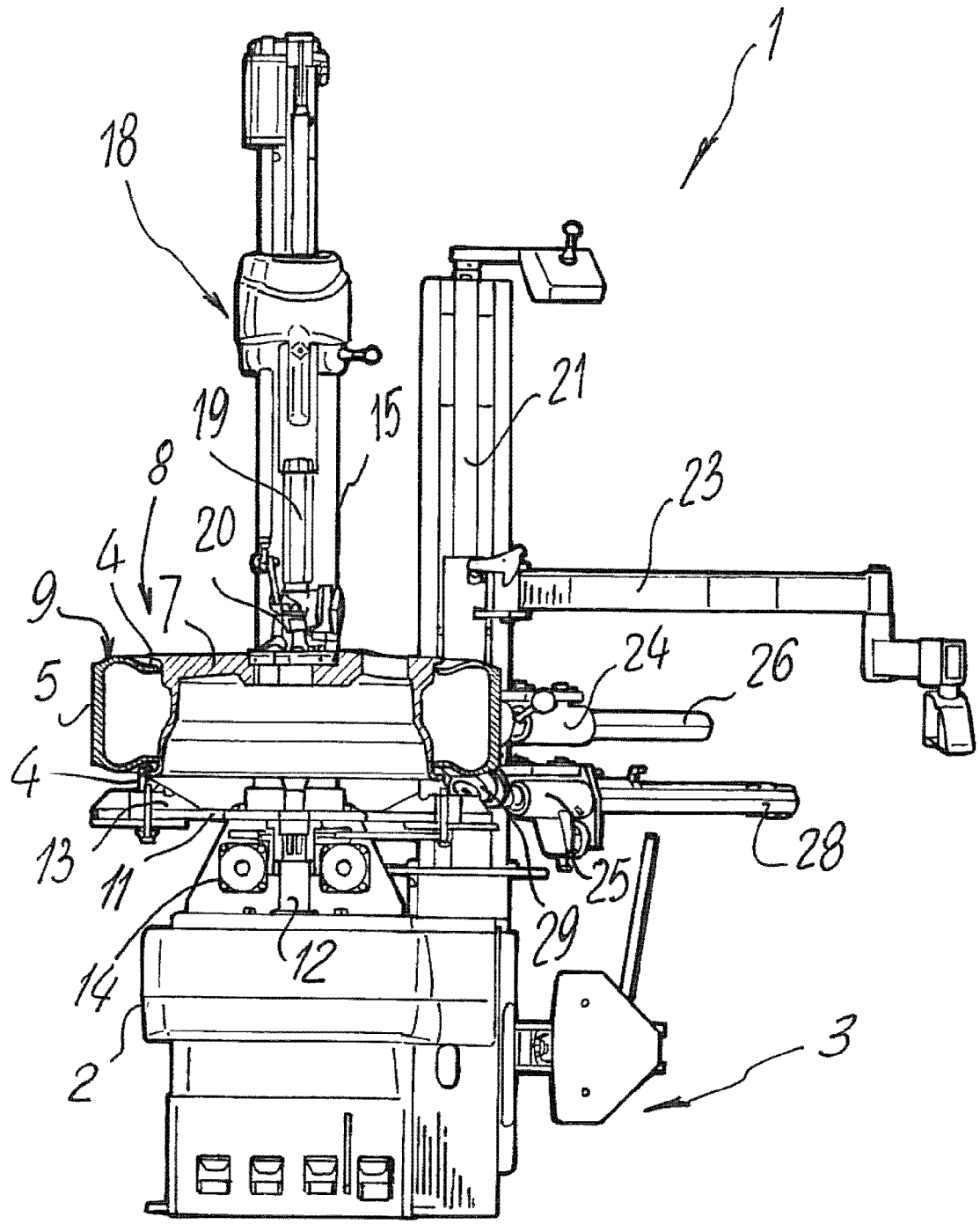
FIG. 2 is a partly sectional front view of the tire uninstalling and installing machine of FIG. 1.

In FIG. 1, the shape of a wheel 8 lying on the working table top 11 is shown by broken lines 30, whereas in FIG. 2 the wheel 8 is fully visible in cross section.

Figure 3:
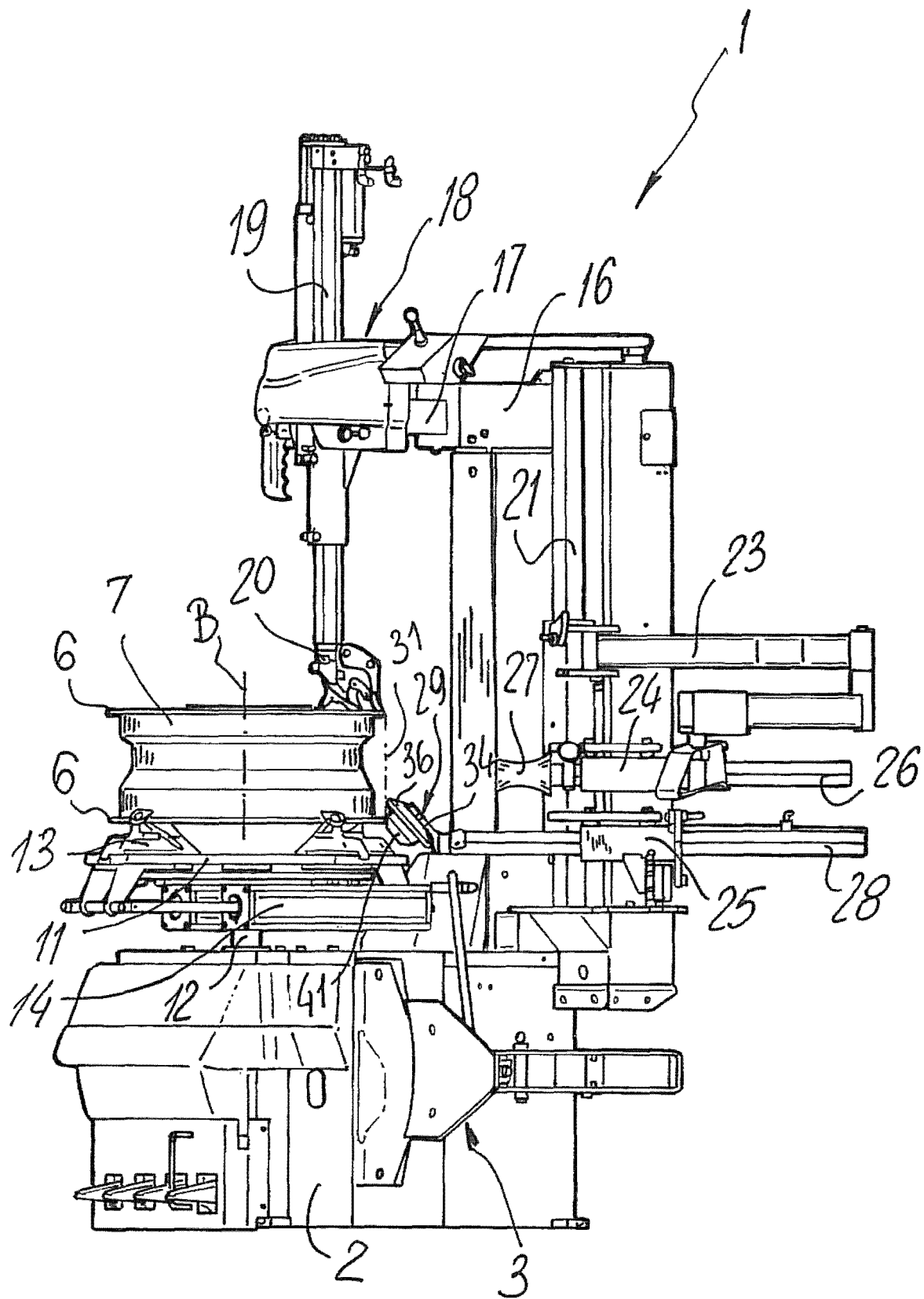
FIG. 3 is a side view of the tire uninstalling and installing machine of FIG. 1 in a step in which a tire is removed from a rim.
Figure 4:
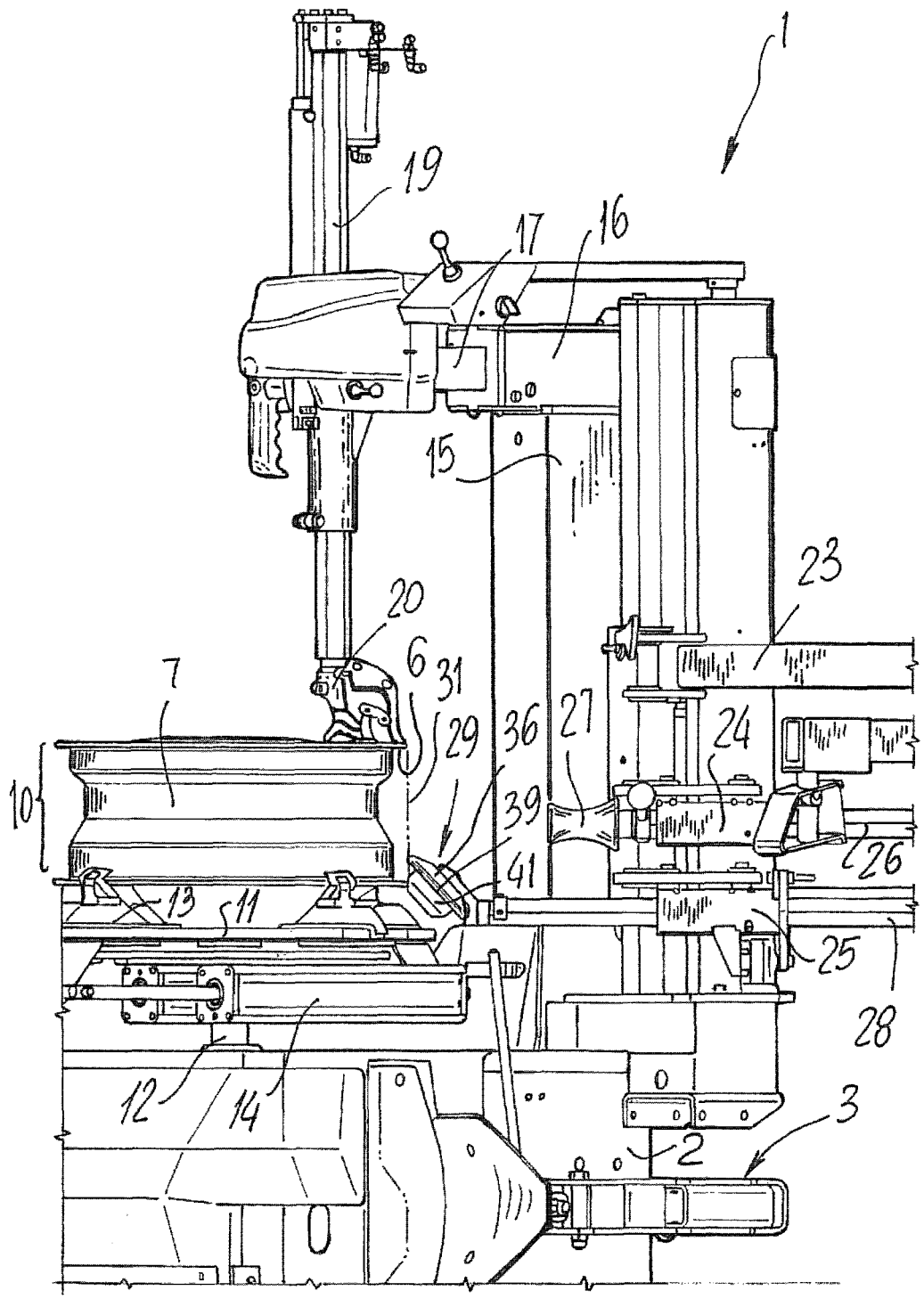
FIG. 4 is a broken away, enlarged view of a part of the tire uninstalling and installing machine of FIG. 3.
Figure 6:
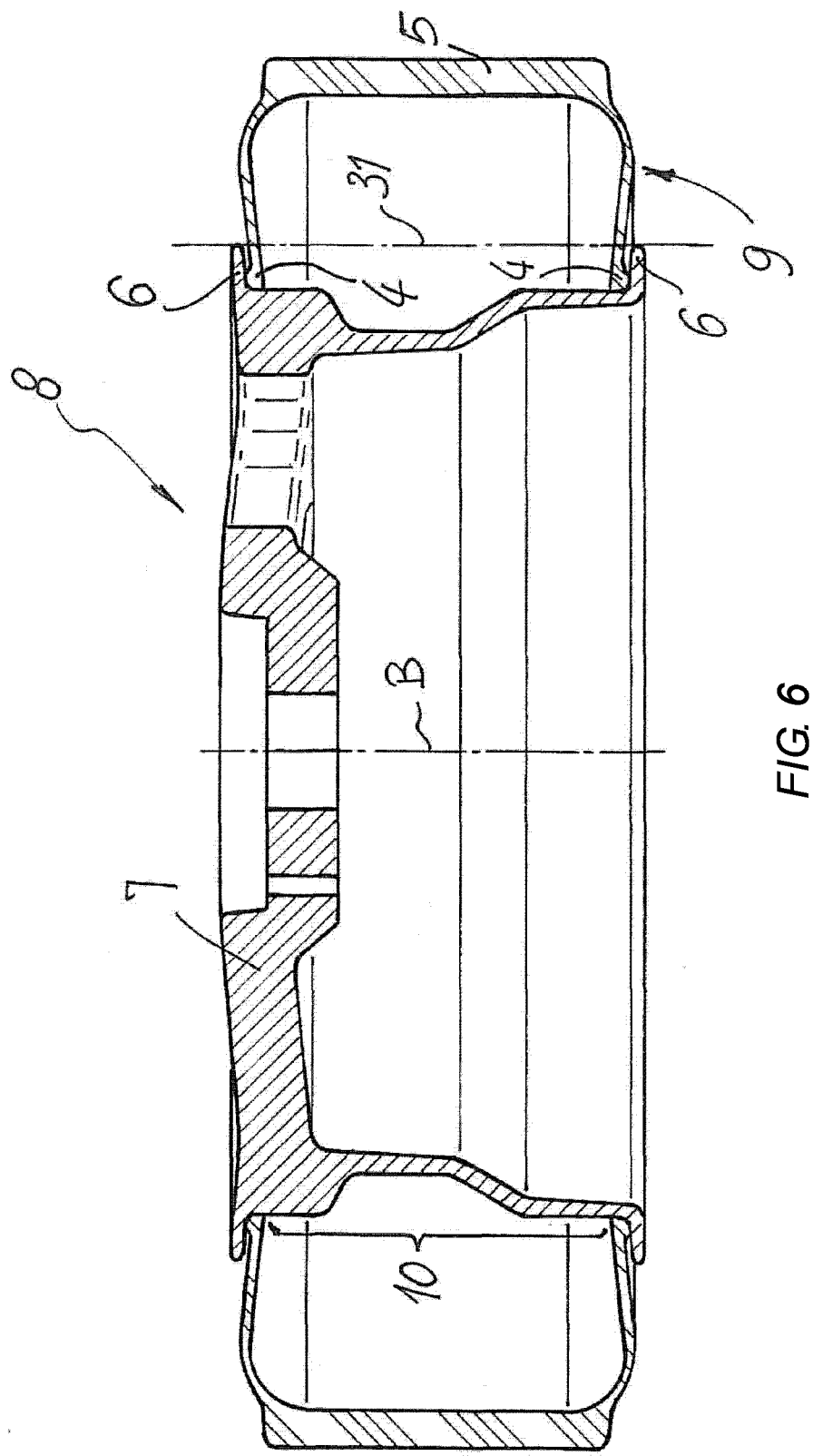
FIG. 6 is a cross sectional view of a vehicle wheel comprising a rim and a tire.

Referring to FIGS. 3 and 6, the peripheral edges 6 of the rim 7 are shown to define a second common lying plane, indicated by a broken line 31.

Figure 5:
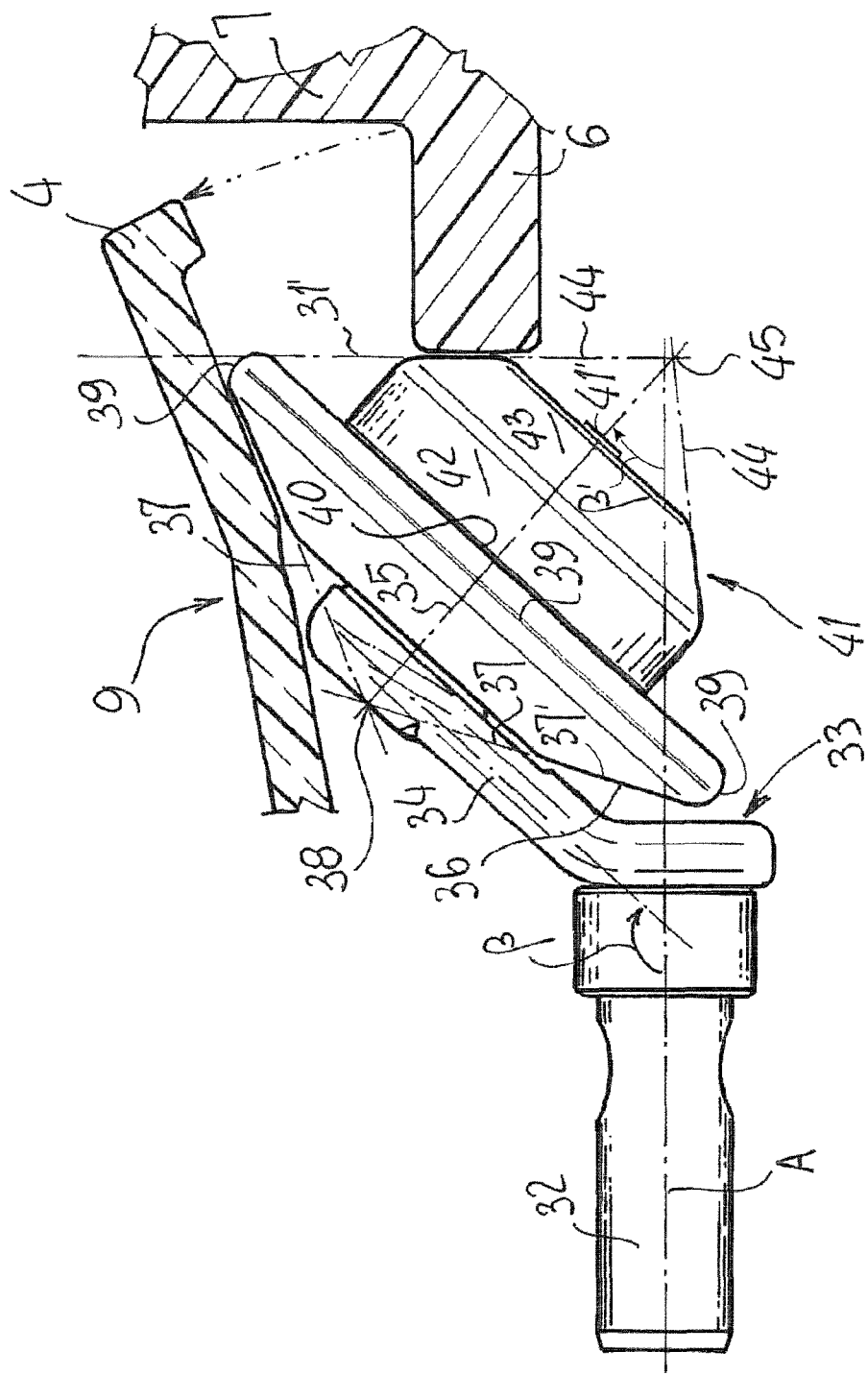
FIG. 5 is a very large-scale lateral schematic view of a tool for tire uninstalling and installing machines of the invention, in a step in which a tire lead is lifted from the corresponding edge of the rim whereto it is installed.

Referring to FIG. 5, the tool 29 is shown to include joining member, embodied as a pin 32, for connection to the end facing towards the working table top 11 of the fourth arm 28, moved by a fluid-dynamic actuator 28', which has a longitudinal axis "A" and supports a flange 33 having a free end 34 bent to form an obtuse angle "β" with the axis "A".

This free portion 34 supports a rotation axis 35 of a freely rotating round disk having a frustoconical outer surface, whose generators 37 intersect and define a first virtual apex 38 and a flared contacting and lifting surface 37'.

This round disk forms an outer profile 39 which is designed to contact a side of a tire 5 and is rounded for this reason, to prevent any damage.

This outer profile or outer contact outline 39 delimits a larger base 40 of the round contact element, embodied as a round disk 36, with a touching means 41 extending therefrom and designed to contact a rim 7, namely a peripheral rim 6 thereof, when the fourth arm 29 is caused to slide towards the working table top 11. In a working condition of round disk 36, its rotational axis 35 is tilted in respect of the longitudinal axis "A" at an acute angle β'.

The touching means 41 is composed of two portions, typically a first portion 42 for connection to the base 40, which has a cylindrical shape, and second extending portion 43 of frustoconical shape, which has a peripheral surface whose generators, indicated by broken lines 44 intersect and define a second virtual apex 45 situated opposite to the first virtual apex 38 with respect to the outer profile 39.

As shown in FIG. 5, both the first virtual apex 38 and the second virtual apex 45 lie on the rotation axis 35 of the round disk 36.

Furthermore, a first common lying plane 31' that contains a generator 44 facing towards the rim 7 and tangent to the outer profile 39 coincides with the second common lying plane 31:

thus, the touching means 41 does not project out of the outer profile 39 of the round disk 36 with respect to the common plane 31.

The operation of the invention is as follows: when a tire 5 of a wheel 8 has to be removed from the rim 7 to which it is installed, the tire 5 is deflated and the beads 4 are removed from the edges 6 of the rim 7 by means of the bead removing device 3 which is typically included in a tire uninstalling and installing machine 1.

Once the bead removing step has been completed, the wheel 8 is taken and laid on the working table top 11, hereinafter simply referred to as table top 11, on which the clamps or jaws 13 have been moved apart beforehand in the centrifugal direction.

When the wheel 8 has been laid on the working table top 11, the drive unit 14 is operated to simultaneously move all the clamps 14 towards one another in the centripetal direction.

These clamps 14 have such a normal, known conformation that they can grasp the rim 7 by slightly lifting it and centering it coaxial with the rotation axis of the motorized shaft 12, and namely engage the rim edge 6 that, with the wheel 8 lying on the table top 11, faces towards the base 2 of the tire uninstalling and installing machine 1, i.e. downwards.

While the wheel 8 is being placed on the table top 11, the shaft 19 is held in an upwardly lifted position with respect to it and both the third arm 26 and the fourth arm 28 are held in an even more retracted position with respect to the table top 11.

The second arm 23 is also held away from the table top 11: thus, the space above and around the latter is completely free, and the steps for positioning the wheel 8 may be performed easily and without any obstacle.

Then, the upper bead 4 of the tire 5 is removed from the corresponding upper edge 6 of the rim 7, by lifting a small portion of the upper bead 4 with a known lever until it passes over a section of the circumference of the upper edge 6 that is sufficient to introduce a bead removing tool, installed to the connection 20 of the shaft 19, between the edge and the upper bead 4.

The terms upper bead 4 and upper edge 6 are intended to indicate the bead 4 and the edge 6 that face upwards when the wheel 8 is clamped on the table top 11, and the terms lower bead 4 and lower edge 6, as used below, will be intended to indicate the opposite bead 4 and edge 6, i.e. those that face downwards in the same position of the wheel 8.

As the shaft 19 is lowered, the bead removing tool is introduced between the upper edge 6 and the upper bead 4 and the table top 11 is rotated.

Thus, the upper bead 4 progressively passes over the whole upper rim 6.

Then, the lower bead 4 is removed from the upper edge 6 of the rim, for full removal of the tire 5 from the coupling channel 10.

In order to carry out this step, the rotation of the table top 11 is stopped and the actuator 28' is driven to linearly advance the fourth arm 29 and cause the tool 29 for tire uninstalling and installing machines 1 to move towards the rim 7, until the touching means 41 contacts the lower edge 6 of the rim 7.

With the touching means 41 contacting the edge 6, the actuator 28', possibly controlled by a known contact sensor 41', optionally installed to the touching means 41, stops its action and the fourth arm 28 is locked in the sleeve 25 in which it is inserted.

In this position, the fourth arm 28 is lifted parallel to itself and slides along the second column 21, by being driven by drive members of the tire uninstalling and installing machine 1, and the outer profile 39 of the round disk 36 wedges itself between the lower edge 6 of the rim 7 and the lower bead 4 of the tire 5, but still within the common lying plane 31.

The lower bead 4 and the corresponding sidewall 9 of the tire, as shown in detail in FIG. 5, rest on the upper portion of the surface of the round disk 46.

The fourth arm 28 is lifted until the part of the lower bead 4 in which the outer profile 39 of the round disk 36 is inserted lifts above the upper edge 6 of the rim 7 and passes over it.

Then the table top 11 is rotated again, and the whole circumference of the lower bead 4 passes over the upper edge 6 of the rim 7.

It will be appreciated that the inclination of the rotation axis 35 of the round disk 36 allows the outer profile 39 to reach the proper position of contact with the lower bead 4 without requiring the tool 29 to fit between the table top 11 and the sidewall 9 of the tire, because the operating position of the outer profile 39 of the tool 29 cannot exceed the common lying plane 31.

Furthermore, the work position of the tool 29 is automatically determined by the contact of the touching means 41 with the lower edge 6 of the rim 7; therefore, the proper position of the tool 29 is certainly reached when the fourth arm 28 stops sliding, even though this cannot be visually ascertained.

The above disclosed invention was found to fulfill the intended objects.

The invention so conceived is susceptible to a number of changes and variants within the inventive concept.

Furthermore, all the details may be replaced by other technically equivalent parts.

In practical implementation, any materials, shapes and sizes may be used as needed, without departure from the scope of the following claims.

What is claimed is:

1. A tool for tire uninstalling and installing machines comprising: a joining member to a movable bearing element of a tire uninstalling and installing machine, the joining member having a longitudinal axis; a round contact element which is born free to rotate by said joining member around a rotation axis and which has an external contact outline configured to contact a side of a tire installed on a rim, said round contact element having: a flared contacting and lifting surface suitable to contact and lift said tire from said rim, said flared contacting and lifting surface extending from a base turned toward said rim and defining a first apex; and touching means having a cylindrical base and frustoconical extension portion configured to contact a peripheral portion of said rim, said touching means protruding from said base toward said rim in a direction opposite to said flared contacting and lifting surface.

2. The tool according to claim 1, wherein said rim comprises at least a peripheral outer edge.

3. The tool according to claim 1, wherein in a working condition of said round contact element, said rotational axis is tilted in respect of said longitudinal axis at an acute angle.

4. The tool according to claim 1, wherein said touching means comprise:
a first joining portion to said base; and
a second extending portion having a flared surface and defining a second apex opposed to said first apex with respect of said outer contact outline, said first joining portion and said extending portion being co-axial with said round element.

5. The tool according to claim 4, wherein said first joining portion is cylindrically shaped and is continuously connected to said second extending portion.

6. The tool according to claim 4, wherein said external contact outline and said flared surface of said second extending portion lie on a first common lying plane which is tangent to both of them and perpendicular to said longitudinal axis.

7. The tool according to claim 4, wherein said first common lying plane is parallel to a second common lying plane which is defined by peripheral edges of said rim arranged in a working position, fixed onto a turntable of the tire uninstalling and installing machine.

8. The tool according to claim 7, wherein in operation said first common lying plane and second common lying plane coincide reciprocally.

9. The tool according to anyone of claim 1, wherein said touching means comprise a contact sensor to which moving means configured to move said movable bearing element are enslaved.

10. A tire uninstalling and installing machine comprising:
a tool for the tire uninstalling and installing machine comprising: a joining member to a movable bearing element of the tire uninstalling and installing machine, the joining member having a longitudinal axis; and a round contact element which is born free to rotate by said joining member around a rotation axis and which has an external contact configured to contact a side of a tire installed on a rim, said round contact element having:
a flared contacting and lifting surface suitable to contact and lift said tire from said rim, said flared contacting and lifting surface extending from a base turned toward said rim and defining a first opposed apex; and
touching means having a cylindrical base and frustoconical extension portion configured to contact a peripheral portion of said rim, said touching means protruding from said base toward said rim in a direction opposite to said flared contacting and lifting surface.

* * * * *